Sept. 27, 1927.    E. C. GLEDHILL    1,643,555
VEHICLE GUARD
Filed Aug. 26, 1925    3 Sheets-Sheet 1

Inventor
E. C. Gledhill.
By Larry Rasey, Attorney

Sept. 27, 1927.  
E. C. GLEDHILL  
VEHICLE GUARD  
Filed Aug. 26, 1925  
1,643,555  
3 Sheets-Sheet 2
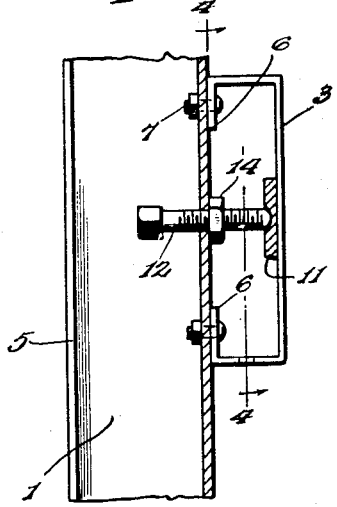
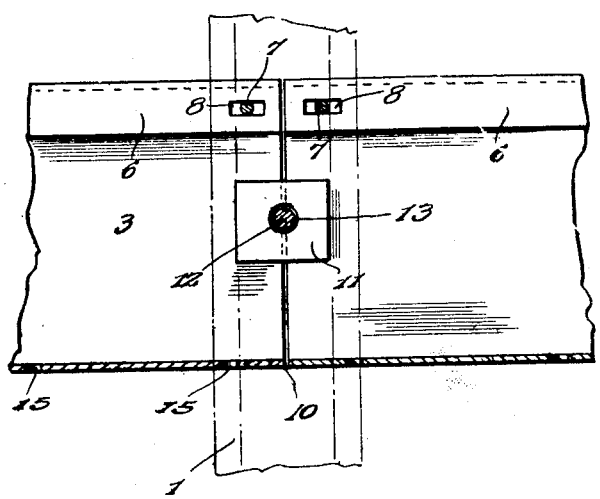
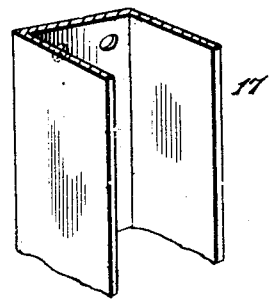
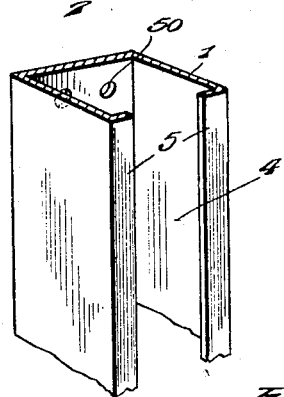
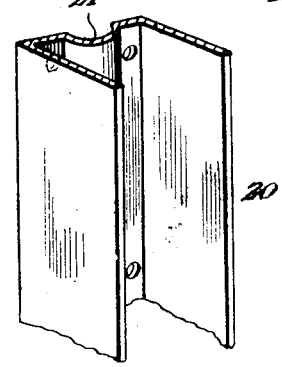
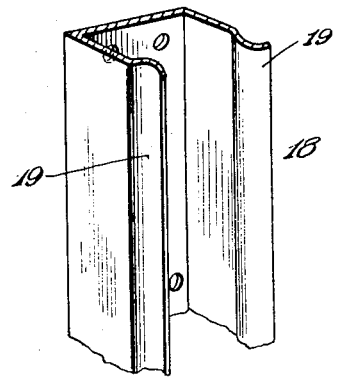
Inventor  
E. C. Gledhill.

Sept. 27, 1927.                E. C. GLEDHILL                 1,643,555
                                VEHICLE GUARD
                            Filed Aug. 26, 1925           3 Sheets-Sheet 3

Inventor
E. C. Gledhill.
By Lacy Tracy, Attorneys

Patented Sept. 27, 1927.

1,643,555

UNITED STATES PATENT OFFICE.

EDWARD C. GLEDHILL, OF GALION, OHIO.

VEHICLE GUARD.

Application filed August 26, 1925. Serial No. 52,625.

This invention is a guard to prevent vehicles running off a road at sharp turns or at the edges of steep grades or precipices, and it seeks to provide a simple structure which may be set up at danger points at low cost to operate effectually in preventing vehicles leaving the road and overturning. A further object of the invention is to provide a structure which will be strong and durable to withstand the shocks incident to the impact of a skidding vehicle and avoid the necessity of frequent repairs, and it also seeks to provide a structure which will be standardized so as to cover variations in the build of vehicles so that any vehicle tending to leave a road or overturn will be intercepted by the guard and serious accidents prevented. The invention is illustrated in the accompanying drawings and will be hereinafter fully set forth.

In the drawings:

Fig. 3 is an enlarged vertical section taken at the joint between two alined rails;

Fig. 4 is a section on the line 4—4 of Fig. 3;

Figs. 5, 6, 7 and 8 are detail perspective views of various forms of posts which may be employed.

Figure 1:
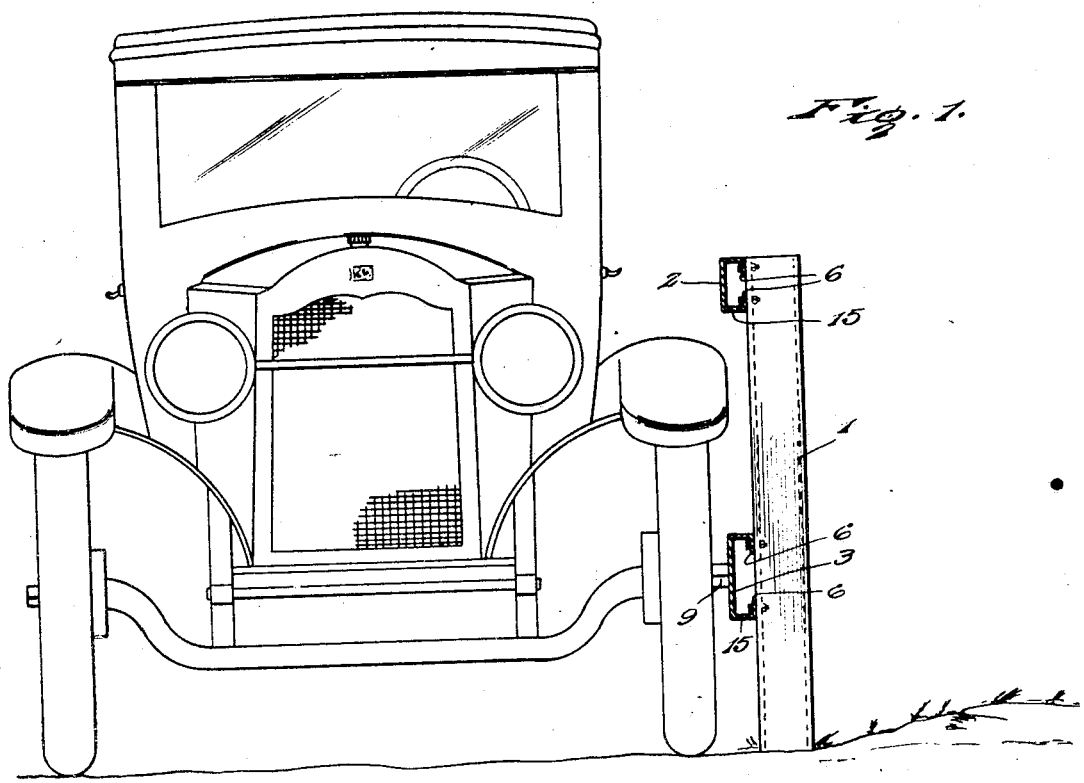
Figure 1 is a view, partly in elevation and partly in vertical section, showing my vehicle guard and illustrating the use of the same by the representation of an automobile in contact therewith.

In carrying out my invention, I set up at intervals along the side of a road, posts 1 which are preferably of metal and tubular in form so as to possess maximum strength with minimum weight. To these posts, I secure rails 2 and 3 which are also preferably of sheet metal and tubular in form to secure the maximum strength for a given weight. In Figs. 2 and 5 more particularly, the post is illustrated as formed from a blank bent or folded longitudinally so as to assume a rectangular form open at one side, as indicated at 4, and having openings 50 formed through its opposite wall to facilitate the fastening of the rails thereto. In this particular form of post, the open side of the post is provided with vertical inwardly projecting flanges 5 which aid in preventing buckling of the parallel transverse side walls of the post in an obvious manner. The open side of the post is arranged away from the road with the opposite parallel closed side thereof fronting the road. The rails 2 and 3 in Figs. 1 to 4 are of similar construction but vary in their vertical dimension and each rail has its front side closed while its rear side is formed with inwardly projecting flanges 6 through which bolts, screws or similar fastening devices are inserted to pass through the openings 50 in the respective posts to secure the rails thereto. The fastening devices are indicated at 7 in Figs. 3 and 4, and it will be noted upon reference to Fig. 4 that the flanges 6 of the rail are preferably formed with longitudinally extending slots 8 to receive the bolts so that the rails may be properly adjusted to compensate for any slight irregularities in their dimensions or edges which may develop in manufacture. As shown clearly in Fig. 1, the lower rail is disposed at such distance above the surface of the road that the hub caps of the wheels of an automobile, indicated at 9, will impinge against the outer wall or side of the rail in the event that the vehicle should skid, and inasmuch as the dimensions and forms of automobiles have now been very thoroughly standardized, the rail may be produced with such a vertical dimension as to cover the entire range of all standard automobiles so that the hub cap upon the wheel of any automobile will impinge against the face of the rail at some point in the height thereof. The upper rail 2 is designed to receive the shock of the vehicle body in the event that the same should be overturning and is located at such height upon the post that it will clear the fenders or mud guards of any automobile and will come into contact with the vehicle body below the windows or glass fittings thereof.

From what has been said, it will be understood that the guard is set up as a permanent structure at the side of a road or along the crest of a hill over which the road is built, and serves its purpose by presenting an obstruction to the skidding vehicle which will check its tendency to overturn and also arrest its movement away from the road. The vehicle will seldom strike squarely against the guard, but if it should come squarely against the guard, the front wheels or possibly the rear wheels would impinge against the lower rail 3 and the movement of the vehicle be thereby positively stopped. Generally the vehicle will strike the guard at a slight angle and its forward movement will not be stopped, although it will be retarded and the hub caps will slide along the lower rail until the machine is again under control. While the rails may be made reasonably long, it is obvious that there is a limit to their length and it, therefore, becomes necessary to provide the rails in sections which are alined and the meeting ends of the rail sections will, of course, be brought together in front of a post, as shown at 10 in Fig. 2. When a vehicle strikes against the guard, the hub caps will generally press against the outer face or wall of the lower rail with such force that the said wall will be bent slightly inward and will assume a concave form instead of retaining its flat vertical shape. The indenting or deformation of one rail section will, of course, not be imparted automatically to the meeting rail section and, therefore, the end of the meeting section would tend to project beyond the dished end of the section which receives the impact of the vehicle, the result being that the hub cap would impinge against the projecting end of the meeting section and serious damage might result from the impact. To meet this condition and prevent such shifting of the end of the section along which the vehicle is sliding as to destroy the flush arrangement of the meeting ends, I provide a bridging support 11 which extends across the joint between the meeting ends of alined sections at the rear of the joint, and this bridging member will obviously maintain the flush arrangement of the meeting ends. To hold the bridging member in contact with the meeting ends of the rail sections, I mount a set bolt or screw 12 in the post with its front end engaged in a seat 13 provided therefor in the bridging member and equip the said bolt or screw with a lock nut 14 whereby it will be held in its adjusted position in the post. This arrangement is shown clearly in Figs. 3 and 4 of the drawings. The form of the rails is such that weight is minimized while maximum strength is attained and at the same time more or less resiliency is imparted to the rail so that, when a vehicle impinges upon the rail, the rail will yield slightly to the shock and cushion the same and will ordinarily resume its former normal shape after the strain imposed thereon has been removed. In assembling the parts, the workmen may reach through the open rear side of the rail to position the fastening screws or bolts in the openings provided therefor in the rail flanges and in the front wall of the post and then reach through the open rear side of the post with a socket wrench to turn home the nuts mounted on said screws or bolts.

Figure 2:
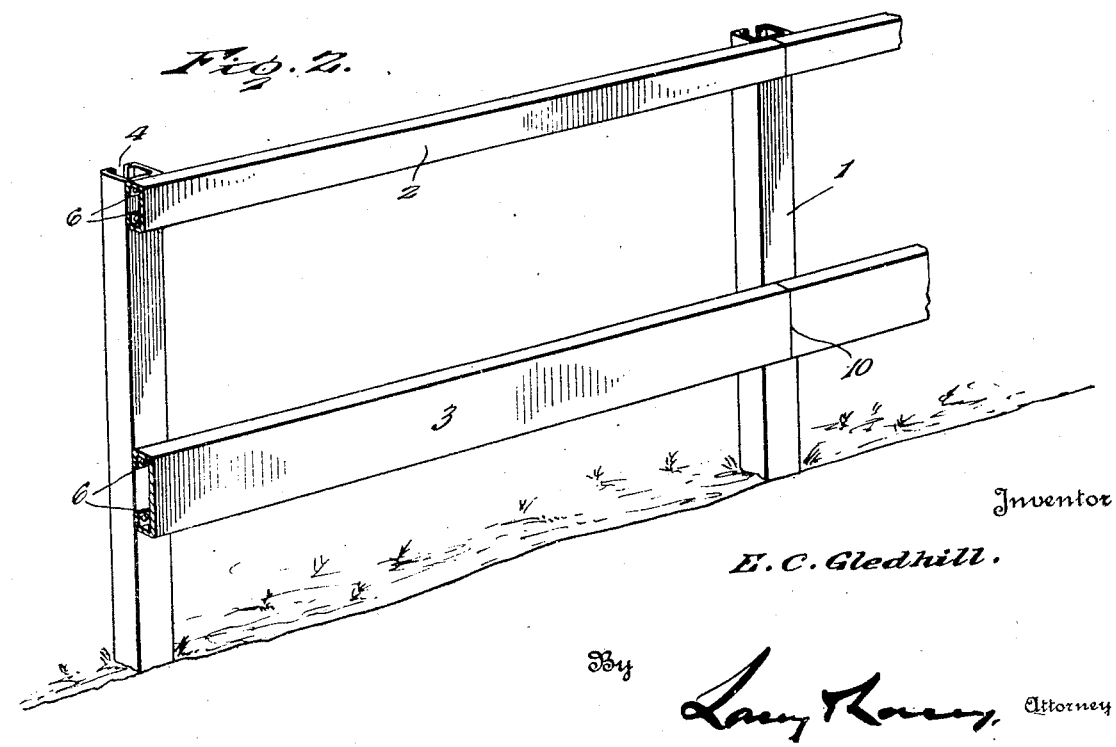
Fig. 2 is a perspective view of a section of the guard.

In the preferred form of rail shown in Figs. 1 and 2, openings 15 are provided through the bottom web of the rail at intervals through the entire length thereof so that any rain or other moisture which may tend to collect between the front wall of the rail and the upstanding flange thereof may drain therefrom and corroding of the rail will be thereby avoided.

In Fig. 5, I have shown the same form of post as is shown in Figs. 1 and 2 but show the same on a larger scale so that the form of the post may be more clearly understood. In Fig. 6, I have shown a post 17 which has its walls arranged at right angles to each other but in which the flanges are omitted, thereby reducing the cost somewhat while providing a post of sufficient strength for use in places where travel is light and the possibility of accident correspondingly reduced. In Fig. 7, I have shown a post 18 in which the side walls are at right angles to the front wall and the inwardly projecting flanges 5 are omitted, but in place of said flanges I form arcuate lips 19 which extend through the height of the post and impart additional strength to the side walls as well as tending to effect a more secure engagement with any anchoring member or base which may be employed in which to set the post. In Fig. 8, I have shown a post 20 is free of flanges and corresponds in form to the post 17 but is provided in its front wall with a vertical groove or corrugated portion 21 which serves the purpose of strengthening said wall and imparting some resiliency thereto so that the post will cooperate with the rails in yielding to the impact of a vehicle but effectually checking the skidding movement of the vehicle.

Figure 9:
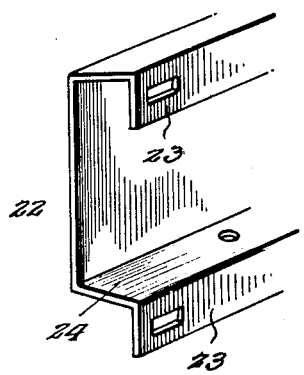
Figs. 9 to 18 are detail perspective views showing various forms of rails which may be employed.
Figure 10:
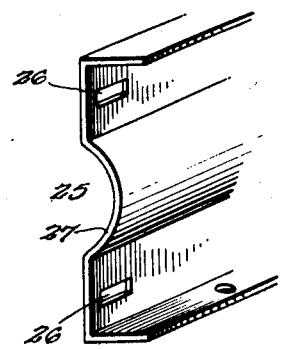
Figure 11:
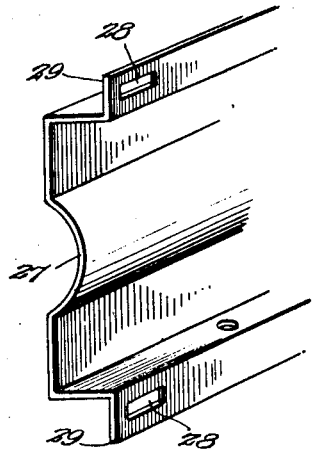
Figure 12:
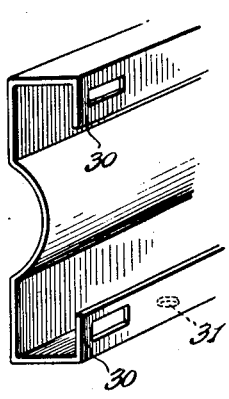
Figure 13:
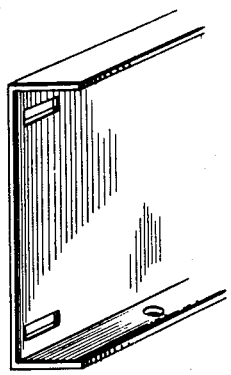
Figure 14:
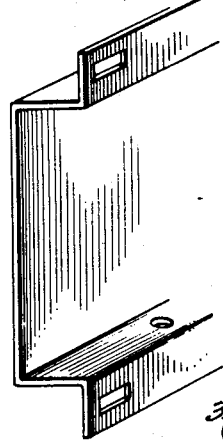
Figure 15:
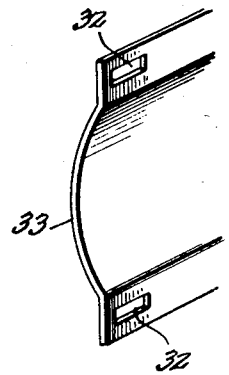
Figure 16:
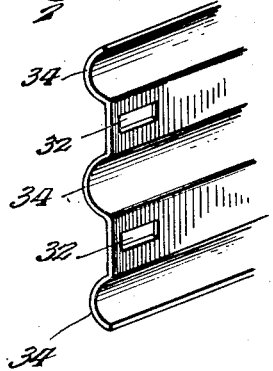
Figure 17:
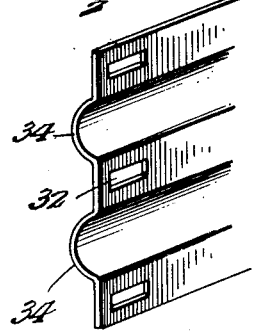
Figure 18:
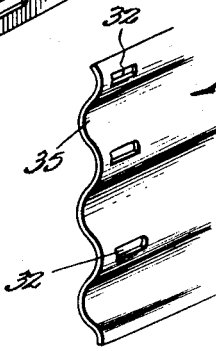

The rail 22 shown in Fig. 9 has a flat front wall corresponding to the flat front wall of the rails 2 and 3 shown in Figs. 1 and 2 and has top and bottom walls extending rearwardly to bear against the post, the flanges 23 in this form of rail, however, both being turned downwardly from the respective webs of the rail, and the lower web 24 is inclined rearwardly so that any moisture which may tend to collect thereon will be caused to drain therefrom. This form of rail has all the advantages of resiliency and strength that the previously described form has and avoids the necessity of drilling or otherwise forming the drain openings in its lower web. The rail 25 shown in Fig. 10 is free of the rear flanges which bear flat against the face of the post and has the rear edges of its top and bottom webs arranged to bear squarely against the post. The openings 26 for the fastening bolts or screws in this form of rail are formed through the front of the same and the fastening devices employed are long enough to extend through the post and through the front wall of the rail. The front wall of the rail in this form is provided with a longitudinally extending dished portion 27 which imparts greater resiliency to the rail and also forms a guide to counteract any tendency of the skidding vehicle to jump as it impinges against the rail and tends to move along the same. The rail shown in Fig. 11 has the same intermediate dished portion 27 shown in Fig. 10 but the openings 28 for the fastening devices are formed in flanges 29 which extend respectively upwardly and downwardly from the top and bottom webs of the rail. This form of rail may be secured to the post somewhat more easily than the form shown in Figs. 1 and 2. The rails shown in Figs. 10 and 11 may have their bottom webs inclined downwardly toward the rear in the same manner that the web 24 shown in Fig. 9 is inclined in order to provide drainage. The rail shown in Fig. 12 is the same as the rail shown in Fig. 11, except that the flanges 30 extend toward each other and drainage openings, indicated at 31, are formed through the bottom web. The rail shown in Fig. 13 is the same as the rail shown in Fig. 10 but omits the grooved portion 27 and has its front wall flat while the rail shown in Fig. 14 is the same as the rail shown in Fig. 11, except that its front wall is flat and vertical. The several forms of rail shown in Figs. 15, 16, 17 and 18 do not have top and bottom webs and are designed to be secured more closely against the post, being provided with openings 32 adjacent their ends to receive the fastening devices which are inserted into the post. The rail shown in Fig. 15 has its edge portions flat while its intermediate portion presents a convex face 33 to any vehicle which may impinge against the guard, and in Figs. 16 and 17 are shown rails which are essentially the same as that shown in Fig. 15, except that the convex faces 34 are of less vertical extent and are multiplied, Fig. 16 showing three convex portions alternating with two flat securing or post-engaging portions while Fig. 17 shows two convex faces alternating with three flat securing portions. In Fig. 18 is shown a rail consisting of a plate free of flat portions but having corrugations 35 extending from end to end and covering the entire vertical extent of the rail, the openings for the securing devices being formed in the troughs of those corrugations which bear against the front face of the post.

From the foregoing description, taken in connection with the accompanying drawings, it will be seen that I have provided a very simple and efficient means for preventing accidents which are due to vehicles skidding upon roads at curves or at the edges of hills, and this means may be easily set up at any danger point.

Having thus described the invention, I claim:

1. A guard for the purpose set forth comprising posts arranged at intervals along the side of a roadway, and rails secured to the front faces of the posts, said rails having open back portions and closed face portions, the face portions being spaced from the posts and extending vertically and positioned at such height above the surface of the roadway as to be engaged by the hubs of a skidding standard motor vehicle and check the movement of the same.

2. A guard comprising a plurality of posts, rail sections having back portions secured directly to the posts and having front face portions in front of and spaced from the posts, the meeting ends of alined sections abutting in front of a post, a bridging member disposed against the rear sides of the front face portions of the rail sections at the meeting ends thereof whereby to overlap said ends and maintain them in flush relation, and a support for said bridging member mounted in the post and bearing against the back of the bridging member to bind the same against the rail sections.

3. A guard comprising a plurality of posts, rail sections having back portions secured directly to the posts and having front face portions free of the posts, the meeting ends of adjacent sections abutting in front of a post, a bridging plate disposed against the inner sides of the front face portions of the rail sections at the meeting ends thereof whereby to overlap said sections and maintain the flush relation of the same, and a supporting screw mounted in the post and having its front end bearing against the back of the bridging plate, said screw being adjustable forwardly through the post to bind the bridging plate against the rail sections.

4. A guard comprising a plurality of posts each having side walls and open at the back between the side walls, rail sections having closed front face portions, top and bottom wall portions extending rearwardly from the face portions to bear against the posts and flanges extending along the rear edges of said wall portions, and fastening devices engaged through said flanges and through the fronts of the posts to secure the rail sections to the posts, the open backs of the posts and the space between said flanges giving access to the fastening devices for setting the same.

In testimony whereof I affix my signature.

EDWARD C. GLEDHILL.